Oct. 10, 1950 G. A. MORTON 2,525,077

ELECTRONIC COMPUTER

Filed Aug. 22, 1945 4 Sheets-Sheet 1

INVENTOR.
GEORGE A. MORTON
BY C. D. Tuska
ATTORNEY

Oct. 10, 1950 G. A. MORTON 2,525,077

ELECTRONIC COMPUTER

Filed Aug. 22, 1945 4 Sheets-Sheet 2

INVENTOR.
GEORGE A. MORTON
BY C D Tuska
ATTORNEY

INVENTOR.
GEORGE A. MORTON
BY C D Tuska
ATTORNEY

INVENTOR.
GEORGE A. MORTON
BY C. D. Tuska
ATTORNEY

Patented Oct. 10, 1950

2,525,077

UNITED STATES PATENT OFFICE 2,525,077

ELECTRONIC COMPUTER

George A. Morton, Princeton, N. J., assignor to Radio Corporation of America, a corporation of Delaware Application August 22, 1945, Serial No. 612,035

14 Claims. (Cl. 235—61)

Figures 1, 2:
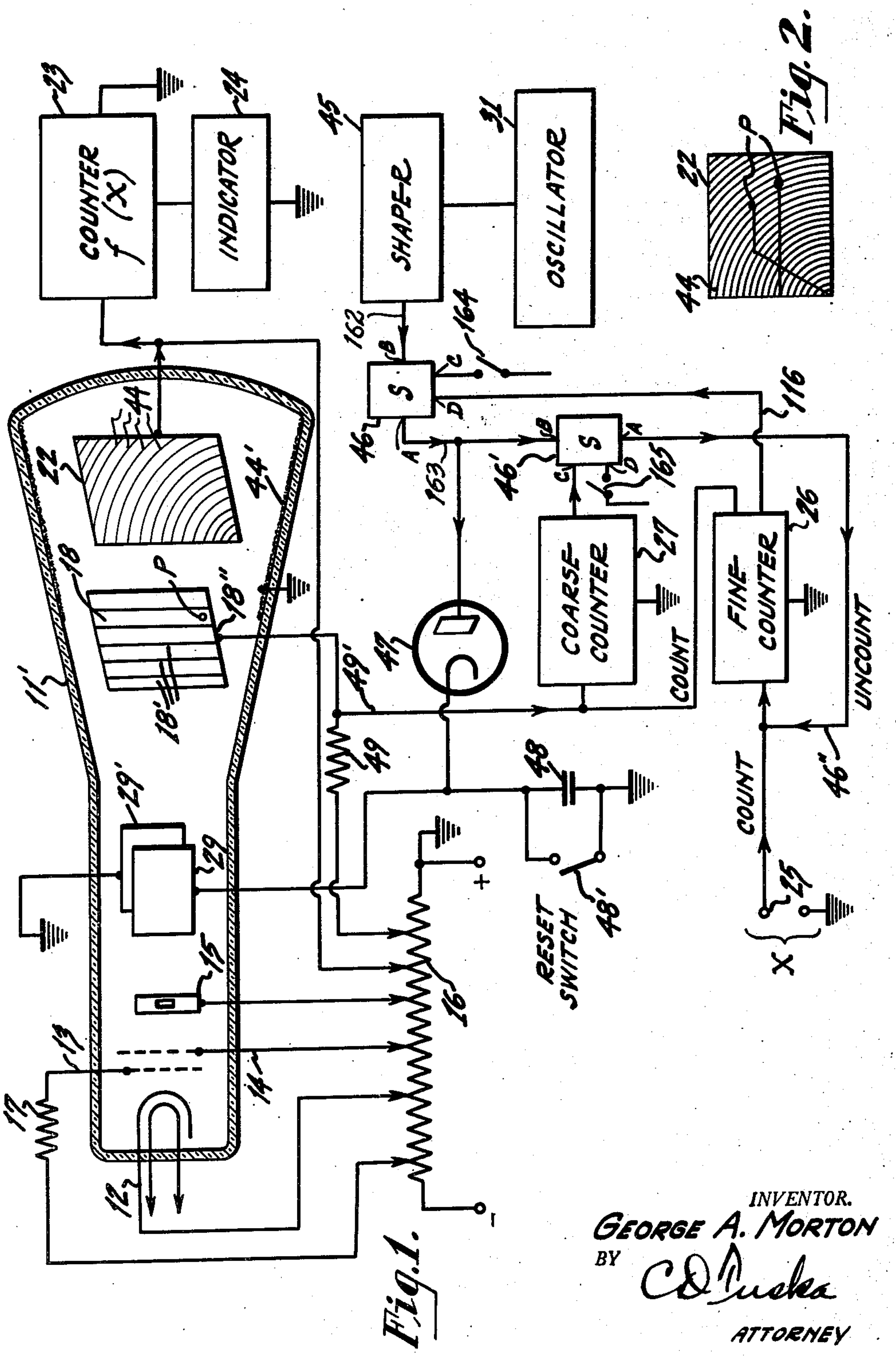

The present application is a continuation-in-part of an application Serial No. 495,802, filed July 21, 1943 which has become abandoned.

This invention relates to electronic computers such as are adapted to derive a value of a function of one or more variables, and has for its principal object the provision of an improved computer and method of operation whereby such a function may be computed with an accuracy greater than the accuracy of particular circuit components by interpolating electronically between predetermined values of each of the variables.

In one modification of the invention, such electronic interpolation is effected by means including a single cathode ray tube in which is provided for each of the variables involved in the computation (1) a screen provided with widely and accurately spaced conductors and (2) a screen provided with closely and less accurately spaced conductors. These coarse and fine screens are so mounted with respect to one another that any inaccuracies produced by irregular spacing of the conductors of the fine screen are periodically corrected by the more accurately spaced conductors of the coarse screen.

Means are provided for applying to the deflectors of the cathode ray tube pulses by which the cathode ray is moved by discrete steps between the conductors of the coarse screen or from one conductor to another of the fine screen.

There also is provided a higher order counter section and a lower order counter section which are so interconnected with the fine and coarse screens and the source of ray deflecting pulses that a count previously established in the coarse counter is reduced by one each time the ray crosses one of the conductors of the coarse screen. When the count of the higher order counter section is reduced to zero, the ray is caused to traverse a number of the fine screen conductors, in response to a number of pulses from an oscillator, determined by the count previously established in the fine counter section.

In moving step by step across the fine and coarse screens, the ray passes over the secondary electron emissive lines of a target from which pulses are delivered to establish in a separate counter a representation of a value of the function determined by the counts established in the higher and lower order counter sections as representative of a given value of the variable or variables.

Important objects are to provide an improved means for computing electronically a function of one or more variables with an accuracy exceeding that inherent in some of the component elements of the computer; and to provide an improved means for interpolating electronically between the higher order values of the variables.

The invention will be better understood from the following description considered in connection with the accompanying drawings and its scope is indicated by the appended claims.

Figure 3:
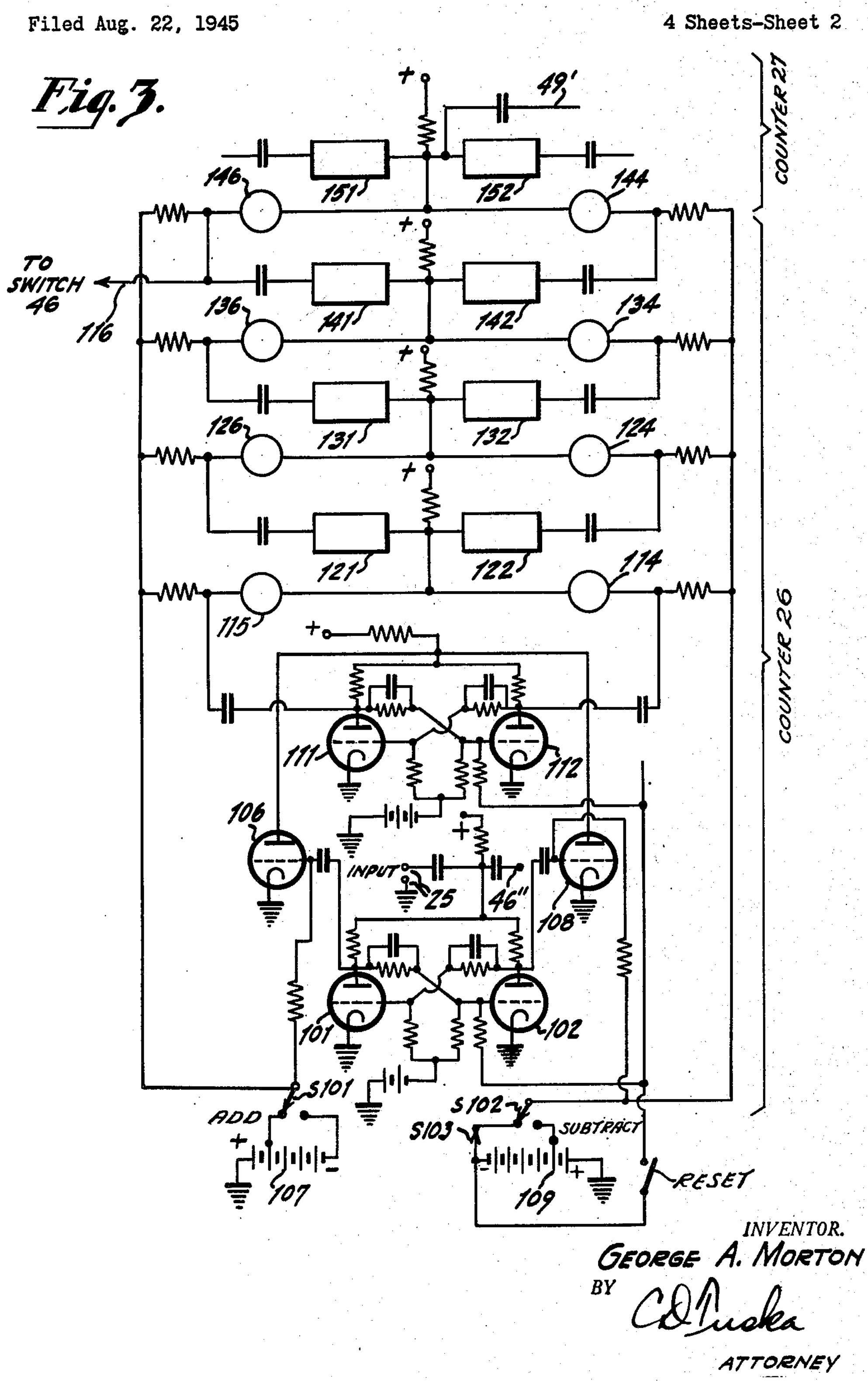
Figures 4, 6:
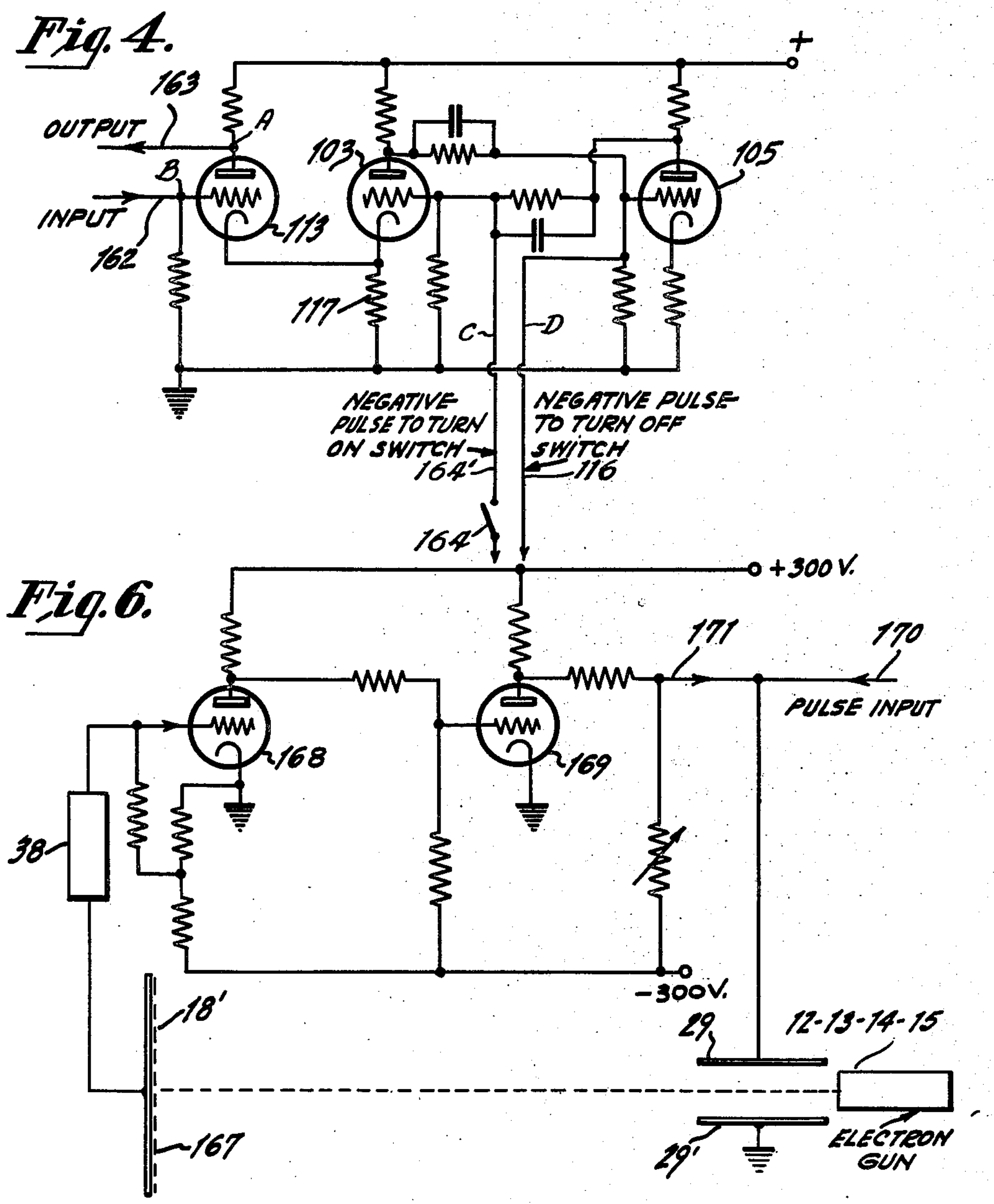
Figure 5:
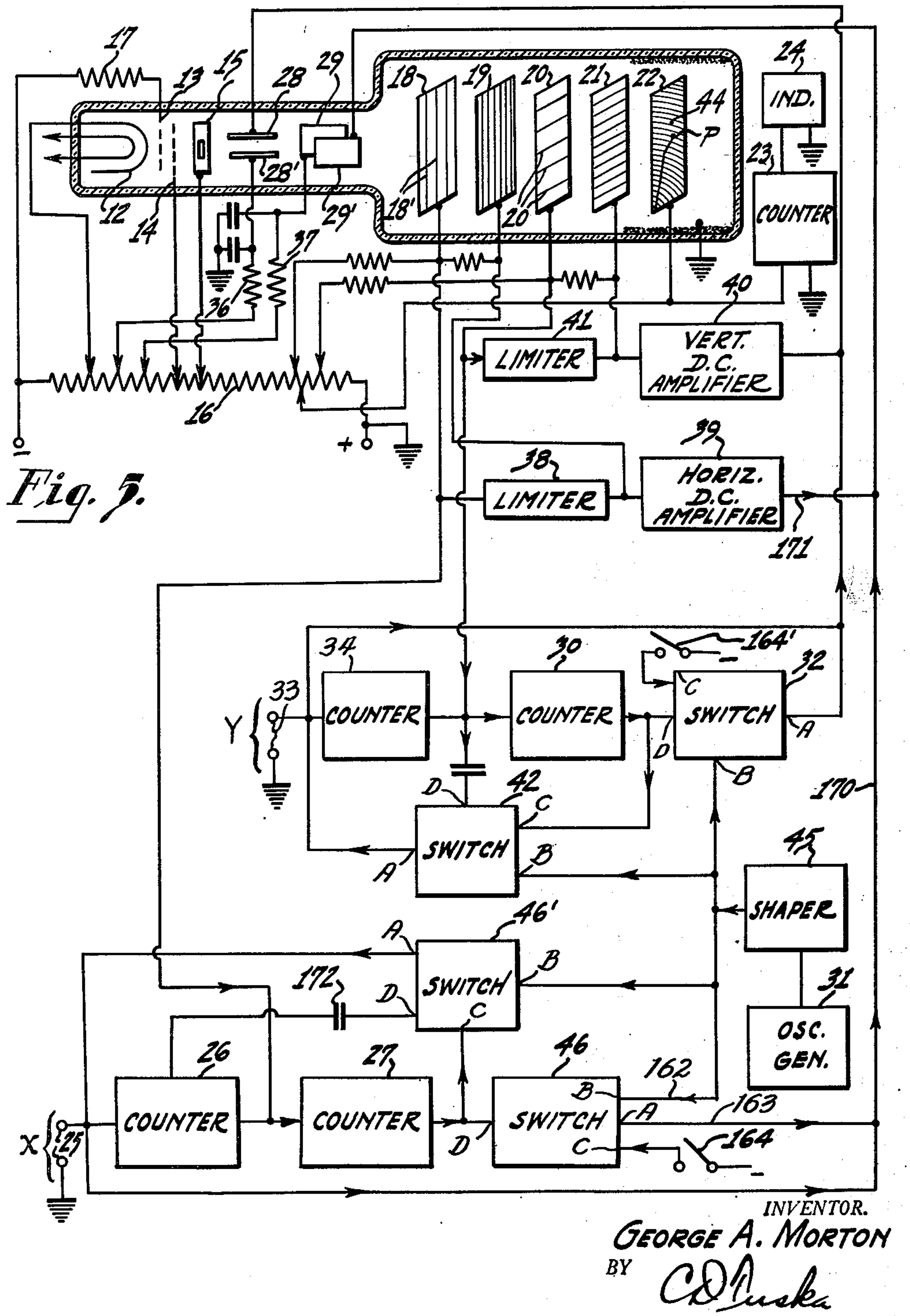

Referring to the drawings:

Figure 1 illustrates a computer constructed in accordance with the invention,

Figure 2 illustrates a cathode ray tube target electrode which forms a part of the computer of Fig. 1, Figure 3 shows certain details of the counters which form a part of the computer of Fig. 1, Figure 4 is a wiring diagram of the switches which form a part of the computer of Fig. 1, Figure 5 illustrates a modified form of the invention, and Figure 6 shows the connections of the amplifiers which form a part of the computer of Fig. 5.

The electronic computer of Fig. 1 includes a cathode ray tube 11′ which has a cathode 12, a control electrode 13, a screen electrode 14, a pair of ray deflectors 29—29′, a ray deflection control screen 18 and a target electrode 22. A resistor 17 is connected in the circuit of the control electrode 13 and a resistor 49 is connected in the circuit of the deflection control screen 18. Voltages for operating the tube 11′ are derived from a suitable source (not shown) through a voltage divider 16 which is grounded at its right-hand end.

Voltage for deflecting the ray of the tube 11′ by discrete steps is applied to the deflectors 29—29′ from an oscillator 31 through a shaper 45, a switch 46, a diode 47 and a capacitor 48. At the end of its travel, the ray may be returned to its normal position at the left-hand side of the target 22 by closing a reset switch 48′ through which the charge of the capacitor 48 is removed.

The deflection control screen 18 includes a plurality of accurately spaced conductors 18′ which (1) are supported in a suitable frame member 18″ and (2) are struck by the cathode ray as it moves step by step in response to the incremental voltage applied to the deflectors 29—29′. Each time the ray strikes one of the conductors 18′, a negative pulse is applied to a conductor 49′. The number of deflection pulses required to move the ray of the tube 11′ from one to another of the conductors 18′ is of course dependent on (1) the voltage of such pulses (applied through diode 47) and (2) the capacitance of the capacitor 48.

The path followed by the ray of the tube 11' is controlled (1) by a coarse counter 27 which is set to determine how many of the conductors 18' are crossed by the ray and (2) by a fine counter 26 which is set to determine how many steps the ray takes after it has crossed enough of the conductors 18' to establish in a counter 23 and an indicator 24 the value of the function corresponding to that part of the value of the variable set up in the counters 27.

A count representative of a given value of the variable X is established in the counters 26 and 27 by applying to a terminal 25 a number of negative pulses chosen to represent that particular value of the variable. The connections between the counters 26 and 27 are such that each time the counter 26 is filled, one negative pulse is delivered from the counter 26 to the counter 27. In general, any value of the variable X will be represented by a higher order count established in the counter 27 and a lower order count established in the counter 26.

Operation of the device of Fig. 1 is initiated by closing and opening of a switch 64 to apply a negative potential to the lead C of the switch 46. The details of this switch are explained in connection with Fig. 4. It is so constituted that the application of a negative pulse to its lead C opens a path for the passage of pulses from the oscillator 31 and the shaper 45 through the diode 47 to the capacitor 48. This capacitor is connected to the deflector 29 which has its potential raised as the charge of the capacitor is increased. As a result, the ray of the cathode ray device is moved from left to right across one after another of the conductors 18'.

The counters 26 and 27 are of a type which may be set to add or subtract the pulses applied to their input terminals. They are disclosed and claimed in a copending application of Flory and Morton, Serial No. 464,293, which was filed November 2, 1942 and is now Patent No. 2,462,275, and their various details are to be discussed in connection with Fig. 3 of the present application. When they are set to the add position, all the negative pulses applied to the terminal 25 are added. When they are set to the subtract position, each negative pulse applied to the input circuit of either of them subtracts one from the count established in it.

The count established in the counter 27 is reduced by negative pulses delivered from the screen 18 when the ray strikes one of the conductors 18'. When the counter 27 is restored to its no count condition, a negative pulse is delivered from it for closing a switch 46' so that pulses are delivered from the oscillator 31 through the shaper 45, the switches 46 and 46' and the conductor 46'' for reducing the count of the counter 26. When the counter 26 is restored to its no count condition, a negative pulse is delivered from it for opening the switch 46. Under these conditions, the ray is positioned at some point, such as the point P, for example, and may be returned to its normal position at the left-hand edge of the target 22 by closing the switch 48'.

The normal position of the ray may be either at the left-hand edge or at the lower left corner of the target 22 depending on whether the desired function is that of a single variable or that of two variables. While the computer of Fig. 1 has been shown as arranged to derive the function of a single variable, it is obvious that its adaptation to the derivation of the function of more than one variable merely involves the provision of (1) a pair of vertical deflectors, (2) a deflection control screen having horizontal conductors spaced similarly to the conductors 18' of the target 18, and (3) additional counters, additional switches, an additional diode, and an additional capacitor for controlling vertical deflection of the ray in the same way that its horizontal deflection is controlled. Such additional deflectors, deflection control screen and control means have been omitted from Fig. 1 to simplify an understanding of the invention. They are shown in Fig. 5 of the present application.

The target 22 may consist of a carbonized nickel plate having lines 44 of a silver magnesium compound suitable for producing secondary electron emission and delivering a pulse to the counter 23 each time the ray crosses one of these lines. If the secondary electron emission from these lines is greater than unity, the delivered pulse will be positive. If it is less than unity, the delivered pulse will be negative. How either a positive or a negative pulse may be utilized to establish a count representative of the desired value of the function is too well understood by those skilled in the art to require explanation.

The secondary electrons emitted from the lines 44 may be collected by a grounded coating 44' or even by the other electrodes of the tube 11' since their effect on the potentials of these electrodes is so small as to be negligible.

The arrangement of the lines 44 is determined by the character of the desired function of the variable or variables. For example, if a function of a single variable is to be derived, deflection of the ray is along only one axis and the lines are spaced from one another along this axis as determined by values derived from the usual function table. If a function of two variables is to be derived, the ray is deflected along one axis in accordance with the value of one of the variables and along another axis in accordance with the value of the other of the variables. In the case of two variables, the lines 44 are spaced and arranged in accordance with the values derived from a function table so that the same number of lines are crossed by the ray regardless of the path followed by the ray from its normal position to a given point on the target 22.

For the sake of simplicity, the lines 44 of the target 22 are shown as circular about the lower left-hand corner of the target. In this case, the derived function $f(XY)=\sqrt{X^2+Y^2}$. For other functions, the arrangement of the lines are different. In any case, the proper arrangement of the lines is readily determined from the function table values keeping in mind the fact that the contour of the lines must be such that the ray must not cross any line twice in its travel from its normal position to the point at which the desired value of the function is counted and indicated. In Fig. 2 is indicated by a horizontal line the path of the ray (1) for the case of Fig. 1 and (2) by a line having inclined and horizontal parts in the path of the ray for the case of Fig. 5 in which the X and Y deflections are simultaneous and the value of X is somewhat greater than that of Y.

As indicated by Fig. 3, the counters 26 and 27 each include a plurality of trigger circuits 101—102, 111—112, 121—122, 131—132, 141—142, 151—152, etc. Each of these trigger circuits includes a pair of triodes which have their anodes and grids cross connected so that current is conducted by only one of the triodes at a time and is transferred from one of the triodes to the other in response to the application of a negative pulse to the common anode terminal of the two triodes. Thus assuming the triode 101 to be conducting, current is transferred to the triode 102 in response to the application of a negative pulse to the terminals 25 and is transferred back to the triode 101 in response to the next successive negative pulse applied to the terminals 25. The same is true of all the other trigger circuits 111—112, 121—122, 131—132, 141—142, 151—152, etc.

The trigger circuits of the different orders are operated to a binary zero representative condition with current conduction in the triodes 101—111—121—131—141—151, etc. by closing and opening a "Reset" switch through which a negative potential is applied from the battery 109 to the control grids of the triodes 102—112—122—132—142—152, etc. This standby condition is always established before the pulses representing the variable X are applied to the terminal 25 of Fig. 1.

Plate voltage for operating these various trigger circuits is applied between the terminals marked with a + sign and ground. Grid bias potential is illustrated as derived from separate batteries for each trigger circuit but obviously may be derived from any other suitable source.

If the lower part of counter of Fig. 3 is assumed to be the counter 26 of Fig. 1, the terminals 25 of Fig. 3 correspond to the terminals 25 of Fig. 1. The counters 26 and 27 of Fig. 1 are in effect the lower order section and the higher order section of a single counter which is connected as indicated by Fig. 3 and is provided with terminals 46″ and 49′ for applying the negative pulses by which the counts of the two sections are reduced. While the section 26 has been shown in Fig. 3 as including five trigger circuits and only the first trigger circuit of the section 27 has been shown, it will be understood that each section of the counter will include a sufficient number of trigger circuits to handle all the required values of the variables.

Negative pulses are applied to the terminals 25 as previously explained for establishing in the counter sections 26 and 27 a representation of a given value of one of the variables. The negative pulses through which current transfer is effected in the trigger circuits 111—112, 121—122, 131—132, etc. are derived from the various anodes through transfer tubes 106, 115, 126, etc. for addition of the pulses applied to the terminals 25 and through transfer tubes 108, 114, 124, etc. for subtraction of the pulses applied from the screen 18 (Fig. 1) to the conductor 49′ and from the oscillator 31 to the terminal 25.

Such transfer of negative pulses through the transfer tubes is controlled by switches S101 and S102. Thus when the switch S101 is in its left-hand closed position, the transfer tubes 106, 115, 126, etc. are biased on by a battery 107 and negative pulses are transmitted through these tubes whenever the right hand section of the related trigger circuit is rendered conductive. When the switch S101 is in its right-hand closed position, however, the transfer tubes 106, 115, 126, etc. are biased off and no negative pulses are transmitted through them. Similarly, the transfer tubes 108, 114, 124, etc. are biased off when the switch S102 is in its left-hand closed position and are biased on when the switch S102 is in its right-hand closed position.

The various steps in the operation of the counter of Fig. 3 are indicated in the following tabulation and are readily understood without detailed explanation. In this tabulation, the first column indicates the successive pulses applied to the terminal 25 for establishing in the counter the representation of a given value of the variable; the second to seventh columns show whether current is being conducted by the right-hand side (R) or the left-hand side (L) after each of the applied pulses; the eighth column indicates the successive pulses applied to the terminal 25 for reducing the count in the counter section 26; and the ninth column shows the position of the switches S101 and S102.

| Add Pulse No. | Trig. Circuit Cond. | | | | | | Subtract Pulse No. | Remarks |
|---|---|---|---|---|---|---|---|---|
| | 101–102 | 111–112 | 121–122 | 131–132 | 141–142 | 151–152 | | |
| 1 | R | R | R | R | R | R | | Switches S101 and S102 closed to left for adding pluses. |
| 2 | L | R | R | R | R | R | | |
| 3 | R | L | R | R | R | R | | |
| 4 | L | L | R | R | R | R | | |
| 5 | R | R | L | R | R | R | | |
| 6 | L | R | L | R | R | R | | |
| 7 | R | L | L | R | R | R | | |
| 8 | L | L | L | R | R | R | | |
| 9 | R | R | R | L | R | R | | |
| | L | L | L | R | R | R | 1 | Switches S101 and S102 closed to right for subtracting pulses. |
| | R | L | L | R | R | R | 2 | |
| | L | R | L | R | R | R | 3 | |
| | R | R | L | R | R | R | 4 | |
| | L | L | R | R | R | R | 5 | |
| | R | L | R | R | R | R | 6 | |
| | L | R | R | R | R | R | 7 | |
| | R | R | R | R | R | R | 8 | |
| | L | L | L | L | L | L | 9 | |
| 1 | R | R | R | R | R | R | | Switches S101 and S102 closed to the left for adding pulses. |
| 2 | L | R | R | R | R | R | | |

In connection with the above tabulation it should be noted that the zero setting or standby condition of the various trigger circuits is established by closing and opening the "Reset" switch. This puts current conduction in the left hand triode of each trigger circuit. With switches S101 and S102 closed to the left so that the left hand transfer tubes are conductive and the right hand transfer tubes are non-conductive, the effect of the first counting pulse applied to the counter input terminal 25 is to transfer current conduction to the right-hand triode of each trigger circuit as indicated by the tabulation.

When a condition representative of the given value of the variable has been established by the application of counting pulses to the terminals 25, the switches S101 and S102 are closed to the right biasing off the transfer 106, 115, etc. and biasing on the transfer tubes 108, 114, etc. Under these conditions, the application of subtracting pulses from the oscillator 31 through the shaper 45, the switches 46 and 46' and the lead 46'' to the input terminals of the trigger circuit 101 and 102 causes current conduction to be transferred in the trigger circuits of the counter 26 as indicated by the second or subtracting section of the above tabulation. The operation of the counter 27 is similar to that of the counter 26 with the exception that the subtracting pulses are applied from the screen 18 through the conductor 49' to the input terminal of the lowest order trigger circuit 151—152 of the counter 27.

For the sake of simplicity, the count has not been made large enough to extend into the counter section 27. It is apparent, however, that whatever count is established in the counter section 27 will be reduced by pulses applied to the lead 49' (Figs. 1 and 3) in exactly the same manner as the count in the counter section 26 is reduced by the application of pulses to the lead 46'' (Figs. 1 and 3).

It will be observed that (1) the first adding pulse transfers current to the right-hand sides of all the trigger circuits and (2) the last subtracting pulse puts current in the left-hand sides of all the trigger circuits. The fact that only the last subtracting pulse puts current in the left-hand side of the highest order trigger circuit of the counter section 26 makes it possible to utilize the anode potential of the left-hand triode of the trigger circuit 141—142 to open the switch 46 and interrupt the supply of pulses from the oscillator 31 when the count of the counter section 26 is reduced to zero.

In like manner, the last subtracting pulse applied from the screen to the conductor 49' of the counter section 27 provides a control pulse by which the switch 46' is closed to transmit subtracting pulses from the oscillator 31 to the lead 46'' of the counter section 26.

The details of the switches 46 and 46' are shown in Fig. 4. Each of these switches includes a trigger circuit 103—105 and a triode 113. The triode 113 is conductive when current is in the right-hand side of the trigger circuit 103—105 and is non-conductive when current is in the left-hand side of this trigger circuit. This change in the conductivity of the triode 113 is the result of change in the voltage drop of a resistor 117 connected in the cathode lead of the triode 103 and is controlled by the application of negative pulses to the "turn-on" lead 164' and to the "turn-off" lead 116. Only when the triode 113 is conductive are pulses applied to the switch input lead 162 delivered at the switch output lead 163. As previously indicated, (1) a negative pulse is applied to the lead 164' by closing and opening the switch 164 for shifting current conduction from the triode 103 to the triode 105 so that pulses are applied from the input lead 162 through the triode 113 to the output lead 163 and (2) the last trigger circuit 141—142 has current conduction transferred to its left hand triode 141 only in response to the last subtracting pulse. When this occurs, a negative pulse is applied to the lead 116 and the switch of Fig. 4 is opened so that pulses are not transmitted between the leads 162 and 163. It is apparent that the application of a positive pulse through the lead 116 to the grid of the triode 105 can not affect the operation of this triode for the reason that it is conducting current while the switch of Fig. 4 is open.

The shaper 45 (Fig. 1) may be any one of the types usually utilized to convert an oscillator output to flat-topped pulses suitable for increasing the charge of the capacitor 48 by discrete steps. The constructional features of such shapers are too well known to require detailed description.

The counter 23 in which a representation of a value of the function is established may be like the counter sections 26 and 27 with the exception that the transfer elements utilized for subtraction may be omitted.

In the operation of the computer of Fig. 1, a count representative of a given value of the variable is established in the counter sections 26 and 27 with switches 46 and 46' open so that no impulses are transmitted through them.

When such count has been established, the switches S101 and S102 (Fig. 3) are closed to the right and a switch 164 is closed and opened to apply to the "turn-on" terminal of the switch 46 a negative pulse whereby this switch is closed. Under these conditions, pulses are applied from the oscillator 31 through the shaper 45, the switch 46 and the diode 47 to the capacitor 48. Each of these pulses increases the charge of the capacitor 48 by a predetermined amount so that the ray of the tube 11' is moved by discrete steps transversely of the conductors 18' of the screen 18.

Each time the ray strikes one of the conductors 18', a negative pulse is delivered through the lead 49' to the input terminal of the counter section 27 and the count of this counter section is reduced by one count.

When the count of the counter section 27 has been reduced to zero, a negative pulse is applied to the "turn-on" lead of the switch 46' and pulses are applied both (1) to continue the step by step increase in the charge of the capacitor 48 and (2) to decrease the count of the counter section 26.

When the count of the counter section 26 has been reduced to zero, a negative pulse is applied through the conductor 116 to the "turn-off" lead of the switch 46, thereby interrupting the application of impulses from the oscillator 31.

This leaves the ray of the tube 11' at some point such as P from which it is returned along the horizontal line of Fig. 2 to its normal position by closing and opening the switch 48'.

The switch 46' is opened by closing and opening a switch 165.

Each time the ray of the tube crosses one of the lines 44 of the target 22, a pulse is delivered to the counter 23. The final count established in this counter represents the value of the desired function of the variable and may be observed on the indicator 24. As is well known to those skilled in the art, the indicator 24 may consist of a plurality of gaseous conduction lamps each of which is connected across the anode resistor on the binary 1 side of a different trigger circuit of the counter 23.

The modification of Fig. 5 is similar in several respects to that of Fig. 1 but differs therefrom in the means by which the step by step movement of the cathode ray of the tube 11 is effected. In this modification is also shown a screen 20 which is provided with accurately spaced horizontal wires 20' and forms a part of the computer of Fig. 1 when this computer is utilized to derive a function of more than one variable. The addition of this screen 20 of course requires the provision of a duplicate set of counters and switches as explained in connection with Fig. 1. This duplicate set of counters and switches is indicated in Fig. 5 by the reference numerals 34, 30, 32 and 42.

The modified means for controlling the step by step movement of the cathode ray includes (1) an amplifier 39, a limiter 38, the screen 18 and a screen 19 for controlling the horizontal movement of the ray and (2) an amplifier 40, a limiter 41, screen 20 and a screen 21 for controlling vertical movement of the ray.

How the amplifier 39 functions in producing the step by step movement of the cathode ray will be understood from consideration of Fig. 6. In this figure, the "electron gun" corresponds to the electrodes 12 to 15 by which the ray of the tube 11 is produced. The ray itself is indicated by a broken line extending between the horizontal deflectors 29—29'. One of the conductors of the screen 18 is represented by an area 18' and the space between such conductors is represented by an area 167. The amplifier 39 is shown as consisting of two stages 168 and 169 which are resistance coupled in a well known manner.

Impulses for moving the cathode ray are applied to the deflectors 29—29' through a lead 170. Impulses for arresting the movement of the ray are applied to the deflectors 29—29' from the output of the amplifier 39 through a lead 171. The input potential of the amplifier 39 is derived from the area 18' through the limiter 38 in the case of the screen 18 (and directly from the conductors of the screen 19 as later explained).

When the ray tends to move onto the area 18', the input potential of the stage 168 is made more negative, the current of this stage is reduced, the input potential of the stage 169 is made more positive, the current of this stage is increased and the potential of the deflector 29 is made more negative, thereby moving the beam toward the area 167. When the ray tends to move onto the area 167 (corresponding to the space between the conductors 18'), the input potential of the stage 168 is made more positive, the current of this stage is increased, the input potential of the stage 169 is made more negative, the current of this stage is decreased and a more positive potential is applied to the deflector 29. In this manner the beam is maintained in a position of equilibrium where it is divided between the areas 18' and 167.

The ray is stabilized in this position until there is applied through the lead 170 to the deflector 29 a pulse of sufficient amplitude to deflect it to, or a little beyond, the next conductor 18' where the ray stabilizing action explained above is repeated. In this way the beam is moved by discrete steps across the screen 18 and also across the screens 19, 20 and 21.

As indicated above, the conductors 18' of the screen 18 are accurately spaced. The conductors of the screen 19 are a predetermined multiple of those of the screen 18 and are so arranged that each conductor of the screen 18 is alined with one of the conductors of the screen 19. The accuracy of the spacing between the conductors of the screen 19 need not be exceptionally high for the reason that the incremental deflection of the ray is corrected or compensated each time the ray strikes one of the accurately spaced conductors of the screen 18. Otherwise stated, relatively accurate interpolation between values defined by the accurately and widely spaced conductors of the screen 18 is provided.

While the conductors of the screen 19 are a predetermined multiple of the conductors of the screen 18, as stated above, it is apparent that this multiple can have any desired value depending on the required accuracy of the interpolation. The whole function of the conductors of the fine screen 19 is to so control the cathode ray that it moves step by step (one step for each pulse applied to the deflector 29') from the left hand side of the target 22. In this step by step movement it (1) crosses a number of the conductors 18' which is determined by the count established in the coarse counter 27 and (2) an additional number of the conductors of the fine screen 19 which is determined by the count established in the fine counter 26. From this it follows that the coarse counter should have as many trigger circuits as there are conductors in the coarse screen 18 and the fine counter should have as many trigger circuits as the number of fine screen conductors for each of the coarse screen conductors.

How many of the conductors 18' are crossed by the ray is determined by the count established in the coarse counter 27. How many conductors of the screen 19 are crossed by the ray after the last conductor 18' (determined by the count established in the coarse counter) is crossed is determined by the count established in the fine counter 26.

The different counts established in the coarse and fine counters (1) represent different values of the variable X, (2) may have any value from a count of one on the fine counter 26 to a count which fills the counters 26 and 27, and (3) are each set up by applying input pulses to the terminal 25 of the fine counter 26.

Thus if the counter 27 is in its standby condition and the counter 26 has had one input pulse applied to it, the switch 46' is closed so that the first pulse from the oscillator 31 restores the counter 26 to its standby condition, as previously explained, and the cathode ray is moved into alignment with the first conductors of the coarse and fine screens where it is stabilized as previously explained. If the coarse counter 27 is in a condition representative of one input pulse and the fine counter 26 is in a condition representative of three input pulses, the first pulse from the oscillator 31 moves the cathode ray to the first conductors of the two screens thus restoring the counter 27 to its standby condition and closing the switch 46' so that successive pulses are applied through it to the input terminal 25 of the fine counter 26. The next three input pulses restore the fine counter 26 to its standby condition thus opening the switch 46 and leaving the ray stabilized at the fourth conductor of the fine screen. This position of the ray is representative of one count of the coarse counter 27 plus some fraction of this count. The value of this fraction, of course, is dependent on the relation between the numbers of conductors of the two screens.

What has been said with respect to the spacing and arrangement of the conductors of the screens 18 and 19 is also true of the screens 20 and 21 which differ from the screens 18 and 19 only in that their conductors are arranged horizontally instead of vertically.

The limiters 38 and 41 each function (1) to equalize the amplitude of the pulses applied from the coarse and fine screens to the inputs of the amplifiers and (2) to isolate the fine screens from the coarse screen and the counter to which it is connected. Thus the limiter 38 serves to make the amplitude of the pulses applied from the coarse screen 38 to the amplifier 39 equal to the amplitude of the pulses applied to this amplifier from the fine screen 19 and to isolate the screen 19 from the screen 18 and counter 27 from the screen 19.

The switches 32, 42, 46 and 46' are of the same type as that illustrated by Fig. 4. With these switches open, a count representative of a given value of the variable X is established in the counters 26 and 27 by applying a predetermined number of pulses to the terminals 25 as explained in connection with Figs. 1 to 4. A count representative of the variable Y is similarly established in the counters 29 and 30 by applying a predetermined number of pulses to the terminal 33.

Reduction of the counts of the counters 26—27 is initiated by closing and opening the switch 164 as explained in connection with Fig. 1. Reduction of the counts of the counters 29 and 30 is initiated similarly by closing and opening the switch 164'. If the horizontal and vertical deflecting systems are operated simultaneously, such operation must be preceded by closing and opening the switches 164 and 164' simultaneously or otherwise so that pulses from the oscillator 31 will be transmitted through them to the deflectors 28 and 29' respectively. These deflecting systems also may be operated separately by closing the switches 164 and 164' at different times.

As these counts are reduced, the ray of the tube 11 is moved from its normal position at the lower left-hand corner of the target 22 horizontally and vertically so that it reaches the point P when all the counts have been reduced to zero. In traveling to the point P, the ray crosses a number of lines 44 and produces a number of pulses such as to establish in the counter 23 a representation of the value of the function corresponding to the given values of the variables X and Y.

The manner in which this result is achieved has been indicated in connection with Figs. 1 to 4. Remembering that the assembly 34—30—32—42 operates in the same way as the assembly 26—27—46—46', it is now to be explained by following through the operation of the circuits by which horizontal movement of the ray is effected.

Assuming that a count representative of a given value of the variable X has been established in the counters 26 and 27 and that the switches 46 and 46' are open, the first step in the operation is to close and open the switch 164. This closes the switch 46.

When the switch 46 is closed, pulses from the oscillator 31 are applied through it to the horizontal deflector 29. The first of these pulses moves the ray to, or a little beyond, the first conductor of the fine screen 19 where it is stabilized at the edge of this conductor as explained in connection with Fig. 6. The second pulse moves the ray to the next conductor of the screen 19 where it is similarly stabilized. This action is repeated for each successive pulse until the ray strikes a conductor of the screen 18.

When the ray strikes the first conductor of the screen 18, a negative pulse is applied from this conductor (1) through the limiter 38 and amplifier 39 for stabilizing the ray at the edge of this first conductor, and (2) to the coarse counter section 27 for reducing its count by one.

Successive pulses applied from the oscillator 31 continue the action outlined above until the count of the counter 27 is reduced to zero.

When the count of the counter 27 is reduced to zero, there is delivered from this counter a negative pulse by which the switch 46 is opened and the switch 46' is closed.

When the switch 46' is closed, pulses are applied through it from the oscillator 31 (1) to the terminal 25 of the fine counter 26 and (2) to the deflector 29, thereby reducing the count of this counter to zero.

When the count of the counter 26 is reduced to zero, the ray is at the edge of a conductor of the screen 19 which is located somewhere between the conductors of the screen 18 and a pulse is transmitted from the counter 26 through a capacitor 172 for opening the switch 46' so that the application of pulses from the oscillator 31 is interrupted.

The operation of the vertical control system is the same as that of the horizontal control system.

As the result of these two deflections there is established in the counter 23 a representation of a value of the function of the variables X and Y, this value of course being determined by the selected values of these two variables.

It is thus seen that the computer of Fig. 1 is readily adapted to derive the function of more than one variable merely by the addition of (1) the screen 20 of Fig. 5 and (2) a vertical control system which is the duplicate of the horizontal control system of Fig. 1. These and similar changes are clearly within the scope of the present invention. The outstanding characteristic of the invention is of course the accurately spaced conductors of the screens 18 and 20 through which any irregularities in the step by step movement of the ray are connected each time the ray strikes one of these accurately spaced conductors.

I claim as my invention:

1. The combination of input terminals to which may be applied a first series of pulses representative of a given value of a variable, means operable in response to said first series of pulses for establishing counts of the higher order digits and the lower order digits of a number representative of said given value of a variable, a cathode ray tube provided with a coarse screen having accurately spaced conductors, with a fine screen having less accurately spaced conductors, with a target electrode having secondary electron emissive lines arranged and spaced in accordance with a desired function of said variable and with ray deflectors, means for applying a second series of electrical pulses to said deflectors for moving said ray from one to another of said conductors, means for stabilizing said ray at each of said conductors, means responsive to impact of said ray on each conductor of said coarse screen for reducing said higher order count by one, and means responsive to each successive pulse of said second series of pulses for reducing said lower order count by one and for deflecting said ray to successive fine screen conductors after said higher order count is eliminated.

2. The combination of input terminals to which may be applied a first series of pulses representative of a given value of a variable, means operable in response to said first series of pulses for establishing counts of the higher order digits and the lower order digits of a number representative of said given value of a variable, a cathode ray tube provided with a coarse screen having accurately spaced conductors, with a fine screen having less accurately spaced conductors, with a target electrode having secondary electron emissive lines arranged and spaced in accordance with a desired function of said variable and with ray deflectors, means for applying a second series of electrical pulses to said deflectors for moving said ray from one to another of said conductors, means for stabilizing said ray at each of said conductors, means responsive to impact of said ray on each conductor of said coarse screen for reducing said higher order count by one, means responsive to each successive pulse of said second series of pulses for reducing said lower order count by one and for deflecting said ray to successive fine screen conductors after said higher order count is eliminated, and means responsive to passage of said ray over said secondary electron emissive lines for establishing a count representative of the desired function of said variable.

3. An electronic computer for deriving a predetermined function of two variables which includes a cathode ray tube having ray generating means, ray deflecting means, electrode pairs each including a fine and coarse screen and a target electrode having ray responsive means spaced thereon in accordance with said function, means including a first pulse accumulator device responsive to one of said variables for deflecting said ray of said tube across one of said pairs and along one coordinate of said target electrode, means including a second pulse accumulator device responsive to the other of said variables for deflecting said ray of said tube across the other of said pairs and along a second coordinate of said target electrode, means including said first and said second pulse accumulator devices responsive to said deflections of said ray across said pairs for interpolating in terms of both of said variables for values of said variables intermediate predetermined discrete deflection steps, and means for deriving voltage pulses from said target electrode of a number representative of the interpolated value of said function of said variables.

4. An electronic computer for deriving a predetermined function of two variables which includes a cathode ray tube having ray generating means, ray deflecting means, electrode pairs each including a fine and coarse screen and a target electrode having ray responsive means spaced thereon in accordance with said function, means including a first pulse accumulator device responsive to one of said variables for deflecting said ray of said tube by discrete steps across one of said pairs and along one coordinate of said target electrode, means including a second pulse accumulator device responsive to the other of said variables for deflecting said ray of said tube by discrete steps across the other of said pairs and along a second coordinate of said target electrode, means including said first and said second pulse accumulator devices responsive to said discrete deflections of said ray across said pairs for interpolating in terms of both of said variables for values of said variables intermediate predetermined ones of said discrete deflection steps, and means for deriving voltage pulses from said target electrode of a number representative of the interpolated value of said function of said variables.

5. An electronic computer for deriving a predetermined function of two variables which includes a cathode ray tube having ray generating means, ray deflecting means, pairs of screen electrodes each including a screen having accurately spaced openings and a screen having less accurately spaced openings and a target electrode having ray responsive means spaced thereon in accordance with said function, means including a first pulse accumulator device responsive to one of said variables for deflecting said ray of said tube by discrete steps across one of said pairs and along one coordinate of said target electrode, means including a second pulse accumulator device responsive to the other of said variables for deflecting said ray of said tube by discrete steps across the other of said pairs and along a second coordinate of said target electrode, whereby both of said variables are interpolated for values of said variables intermediate predetermined ones of said discrete deflection steps, means for deriving voltage pulses from said target electrode of a number representative of the interpolated value of said function of said variables, and means responsive to said derived pulses by indicating the value of said function.

6. The combination of a cathode ray device including ray deflecting means and a pair of screen electrodes one of which has relatively closely spaced conductors and the other of which has relatively widely spaced conductors each aligned with a different one of said closely spaced conductors, means for applying pulses to said deflecting means, and means connected between said screen electrodes and said deflecting means for stabilizing said ray at successive ones of said closely spaced conductors in response to successive ones of said pulses.

7. The combination of a cathode ray device including ray deflecting means and a pair of screen electrodes one of which has relatively closely spaced conductors and the other of which has relatively widely spaced conductors each aligned with a different one of said closely spaced conductors, means for applying pulses to said deflecting means, means connected between said screen electrodes and said deflecting means for stabilizing said ray at successive ones of said closely spaced conductors in response to successive ones of said pulses, and counter means connected to said widely spaced conductor screen for predetermining the number of said widely spaced conductors at which said ray is stabilized.

8. The combination of a cathode ray device including ray deflecting means and a pair of screen electrodes one of which has relatively closely spaced conductors and the other of which has relatively widely spaced conductors each aligned with a different one of said closely spaced conductors, means for applying pulses to said deflecting means, means connected between said screen electrodes and said deflecting means for stabilizing said ray at successive ones of said closely spaced conductors in response to successive ones of said pulses, counter means connected to said widely spaced conductor screen for predetermining the number of said widely spaced conductors at which said ray is stabilized, and means operable in response to a predetermined condition of said counter means for predetermining the number of said closely spaced conductors at which said ray is stabilized after it is stabilized at the last of said number of widely spaced conductors.

9. The combination of pairs of input terminals to the first of which pairs may be applied a first series of pulses representative of a given value of a variable, means operable in response to said first series of pulses for establishing counts of the higher order digits and lower order digits of a number representative of said given value of a variable, means for applying a second series of pulses to the second of said pairs, means responsive to said second series of pulses for reducing said higher order count by one in response to each successive group of a predetermined plurality of said second series of pulses, and means responsive to the elimination of said higher order count for reducing said lower order count by one in response to each successive one of said second series of pulses.

10. The combination of pairs of input terminals to the first of which pairs may be applied a first series of pulses representative of a given value of a variable, means operable in response to said first series of pulses for establishing counts of the higher order digits and lower order digits of a number representative of said given value of a variable, means for applying a second series of pulses to the second of said pairs, means responsive to said second series of pulses for reducing said higher order count by one in response to each successive group of a predetermined plurality of said second series of pulses, means responsive to the elimination of said higher order count for reducing said lower order count by one in response to each successive one of said second series of pulses, and means responsive to the elimination of said lower order count for interrupting the supply of said second series of pulses.

11. The combination of pairs of input terminals to the first of which pairs may be applied a first series of pulses representative of a given value of a variable, means operable in response to said first series of pulses for establishing counts of the higher order digits and lower order digits of a number representative of said given value of a variable, means for applying a second series of pulses to the second of said pairs, a cathode ray tube including a screen having accurately spaced conductors, means including said screen for reducing said higher order count by one in response to each successive group of a predetermined plurality of said second series of pulses, and means responsive to the elimination of said higher order count for reducing said lower order count by one in response to each successive one of said second series of pulses.

12. The combination of pairs of input terminals to the first of which pairs may be applied a first series of pulses representative of a given value of a variable, means operable in response to said first series of pulses for establishing counts of the higher order digits and lower order digits of a number representative of said given value of a variable, means for applying a second series of pulses to the second of said pairs, a capacitor connected to be charged by said second series of pulses, a cathode ray tube including a ray deflector connected to said capacitor and a screen having accurately spaced conductors, means including said screen connected to said second pair of input terminals for reducing said higher order count by one in response to each successive group of a predetermined plurality of said second series of pulses, and means responsive to the elimination of said higher order count for reducing said lower order count by one in response to each successive one of said second series of pulses.

13. In a computer for deriving a predetermined function of two variables, the combination of a cathode ray tube having (1) ray generating means (2) ray deflectors, (3) electrode pairs each including coarse and fine screens and (4) a target electrode having ray responsive means spaced thereon in accordance with said function, means including a first pulse accumulator device connected to the first of said coarse screens and responsive to the first of said variables for deflecting the ray of said tube by discrete steps across the first of said pairs of screens and along a first coordinate of said target electrode, means including a first D.-C. amplifier connected between said first coarse screen and a first of said deflectors for stabilizing said ray at the end of each step along said first coordinate, means including a second pulse accumulator device connected to the second of said coarse screens and responsive to the second of said variables for deflecting the ray of said tube across the second of said pairs of screens and along a second coordinate of said target electrode, means including a second D.-C. amplifier connected between said second coarse screen and the second of said deflectors for stabilizing said ray at the end of each step along the second of said coordinates, and means including said first and second accumulator devices responsive to said discrete deflections of said ray across said pairs of screens for interpolating in terms of both of said variables for values of said variables which are greater than those represented by said discrete deflection steps.

14. In a computer for deriving a predetermined function of two variables, the combination of a cathode ray tube having (1) ray generating means (2) ray deflectors, (3) electrode pairs each including coarse and fine screens and (4) a target electrode having ray responsive means spaced thereon in accordance with said function, means including a first pulse accumulator device connected to the first of said coarse screens and responsive to the first of said variables for deflecting the ray of said tube by discrete steps across the first of said pairs of screens and along a first coordinate of said target electrode, means including a first D.-C. amplifier connected between said first coarse screen and a first of said deflectors for stabilizing said ray at the end of said step along said first coordinate, means including a second pulse accumulator device connected to the second of said coarse screens and responsive to the second of said variables for deflecting the ray of said tube across the second of said pairs of screens and along a second coordinate of said target electrode, means including a second D.-C. amplifier connected between said second coarse screen and the second of said deflectors for stabilizing said ray at the end of each step along the second of said coordinates, means including said first and second accumulator devices responsive to said discrete deflections of said ray across said pairs of screens for interpolating in terms of both of said variables for values of said variables which are greater than those represented by said discrete deflection steps, and means for deriving from said target electrode voltage pulses of a number representative of the interpolated value of said function of said variable.

GEORGE A. MORTON.

REFERENCES CITED

The following references are of record in the file of this patent:

UNITED STATES PATENTS

| Number | Name | Date |
|---|---|---|
| 2,404,047 | Flory et al. | July 16, 1946 |
| 2,435,840 | Morton | Feb. 10, 1948 |
| 2,435,841 | Morton et al. | Feb. 10, 1948 |
| 2,446,945 | Morton et al. | Aug. 10, 1948 |